United States Patent [19]

Niederer

[11] Patent Number: 4,681,604
[45] Date of Patent: Jul. 21, 1987

[54] MULTISTAGE FLUID FILTER AND METHOD

[76] Inventor: Kurt W. Niederer, 3021 Mountainbrook Rd., Charlotte, N.C. 28210

[21] Appl. No.: 856,964

[22] Filed: Apr. 29, 1986

[51] Int. Cl.$^4$ .................. B01D 47/00; B01D 50/00
[52] U.S. Cl. .................................. 55/96; 55/97;
 55/284; 55/247; 55/288; 55/293; 55/295;
 55/301; 55/343; 55/344
[58] Field of Search .................. 210/264, 267, 269;
 55/284, 350, 286, 410, 287, 418, 288, 293, 210,
 295–300, 212, 213, 215, 301, 302, 342, 343, 344,
 350, 96, 97

[56] References Cited

U.S. PATENT DOCUMENTS

| | | | |
|---|---|---|---|
| 3,194,683 | 7/1965 | Grosvenor | 210/269 |
| 3,994,810 | 11/1976 | Schaeffer | 210/103 |
| 4,226,715 | 10/1980 | Niederer et al. | 210/783 |
| 4,360,369 | 11/1982 | Niederer | 55/283 |
| 4,430,220 | 2/1984 | Litzenburger | 210/333.1 |
| 4,439,327 | 3/1984 | Müller | 210/772 |
| 4,532,045 | 7/1985 | Littmann | 210/269 |

*Primary Examiner*—Frank Sever

*Attorney, Agent, or Firm*—W. Thad Adams, III

[57] ABSTRACT

A fluid filter (10) comprises a plurality of separate filtration chamber (14–18) with a fluid inlet (12) and a fluid outlet (13). All of the filtration chambers (14–18) are identical and each contain two vertically-spaced doors (28, 29) on one end and two similarly vertically-spaced doors (30,31) on the other end. In addition, each of the filtration chambers (14–18), includes a trap door (33) through which accumulated particulate matter is discharged. The filtration chambers (14–18) are defined as first and second filtration stages and a cleaning stage. By sequencing the opening and closing of doors (28, 29, 30 and 31) the interconnection between the filtration chambers (14–18) is changed. As particulate matter is accumulated on the inner surface of a filtration medium (25) the first and second filtration stages and cleaning stages are changed so that each of the chambers (14–18), in turn, serve as all or part of the first filtration stage, second filtration stage and cleaning stage. Accordingly, the filter can operate continuously after a filter layer is accumulated on the filter medium in any one of the filtration chambers without a significant decrease in filtration efficiency.

16 Claims, 15 Drawing Figures

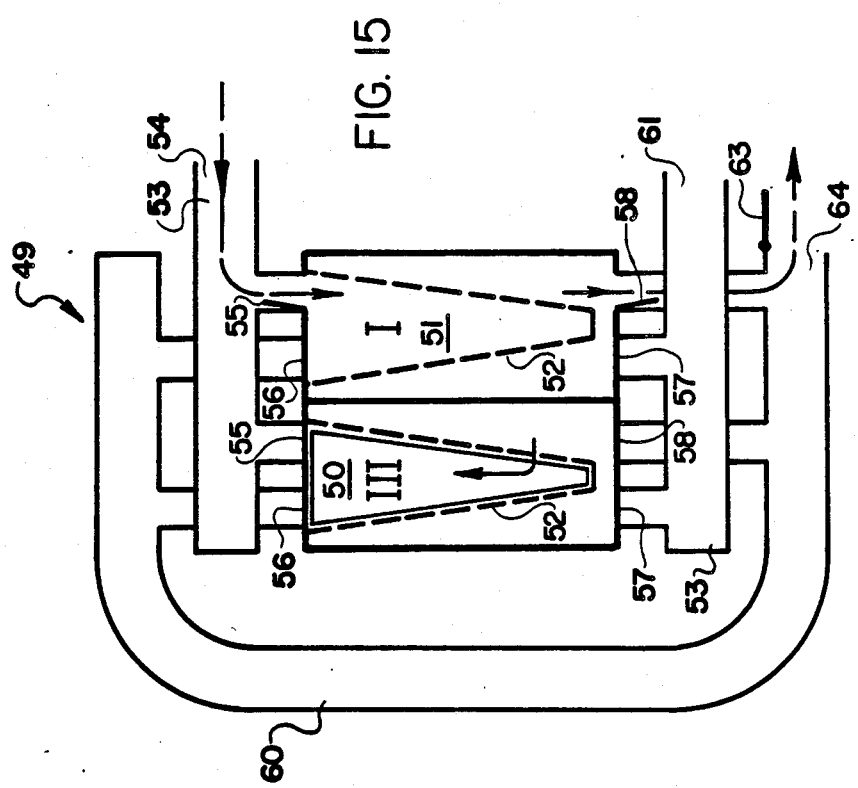

MULTISTAGE FLUID FILTER AND METHOD

TECHNICAL FIELD AND BACKGROUND OF THE INVENTION

This invention relates to a multistage fluid filter for filter entrained particulate matter from a moving fluid stream and a method for filtering fluids to remove entrained particulate matter. In particular, the application discloses a multistage fluid filter wherein enhanced filtration efficiency is achieved by sequentially redefining filtration zones as entrained particulate matter accumulates on filter media in certain of the filtration chambers. The fluid filter is characterized by having relatively few moving parts and by the ability to be very substantially increased in size and capacity without adversely affecting the filtration efficiency of the filter.

Prior art patents disclose the concept of forming a filter medium of enhanced filtration capacity by using a bare filter surface and accumulating on the upstream side of the filter surface a layer of the particulate matter being filtered. It has been learned that such accumulated particulate matter forms a highly efficient filter of that particular substance. However, one difficulty with such structures is that as the layer of particulate matter accumulates on the filter surface, the resistance to passage of fluid through the accumulating filter layer increases as the filtration efficiency increases. At some point, the energy required to force the fluid through the accumulated layer of particulate matter is so great as to render the filter uneconomical both from a filtration capacity and energy consumption standpoint. Some prior art patents relating to the above concept utlize an endless drum of perforated metal having a filter screen thereon through which fluid is passed. Particulate matter in the fluid accumulates on the upstream side of the drum. The interior and/or exterior of the drum is defined into a prefilter zone in which the filter layer is accumulated to its optimum thickness. Air passing downstream of the filter layer in this zone is recirculated back through the filter to prevent the introduction of less than optimally filtered fluid into the environment. Once the filter layer has reached a suitable thickness, it is passed into a second zone where fluid is passed through the layer of particulate matter for its primary filtration step. Fluid downstream in this zone is exited into the environment. A third doffing zone strips the accumulated particulate matter from the surface of the drum whereupon the bare drum surfaces moves back into the first filter zone. Such filters represent an improvement over earlier filters which caused substantial variations in filtration efficiency and energy consumption because of the necessity to periodically strip the layer of particulate matter from the filtration surface, leaving only the bare filter screen which filters relatively inefficiently. However, the rotating drum-type of filter must be very carefully sealed on its ends and at the line of separation between the various zones. Perfect sealing under such circumstances is difficult since the drum is rotating and a seal must be created against the underside of the perforated rotating drum.

It is also cumbersome to rotate a large filter member which limits its size. Additionally, the vibration during the rotation releases some contaminants into the filtered air.

SUMMARY OF THE INVENTION

Therefore, it is an object of the invention to provide a multistage fluid filter for filtering entrained particulate matter from a moving fluid stream at substantially constant fluid pressure and filtration efficiency during continuous on-line operation.

It is another object of the invention to provide a multistage fluid filter which reduces the number of moving parts which must cooperate with the filtration medium.

It is another object of the present invention to provide a multistage fluid filter wherein particulate matter is collected on the upstream side of a stationary filter medium and wherein the filtration stages of the filter change in sequence depending on the extent of particulate matter accumulation on the filter medium in any given filtration stage.

It is yet a further object of the present invention to provide a method of filtering particulate matter from a moving fluid stream in a multistage fluid filter.

These and other objects of the present invention are achieved in the preferred embodiments disclosed below by providing a multistage fluid filter for filtering entrained particulate matter from a moving fluid stream. The filter includes at least first and second filtration chambers, each filtration chamber having a filtration medium positioned therein from an upstream side to a downstream side thereof. Conduit means are provided for interconnecting the first and second filtration chambers in series for fluid flow from the downstream side of one of the two chambers defined as a first filter stage to the upstream side of the other of the two chambers defined as a second filter stage for two stage filtration of the moving fluid. Fluid is diverted on the upstream and downstream side past a filtration chamber to define a cleaning stage within the filtration chamber.

Cleaning means are provided for cleaning particulate matter from the filter medium in the cleaning stage while fluid flow therethrough is diverted. Sequencing means are provided for selectively operating the diverting means to, after cleaning particulate matter from the filter medium in the cleaning stage and, upon an increase in resistance to fluid flow through the first filter stage caused an increase in thickness and/or density in the layer of particulate matter, redefine the cleaning stage as the first filter stage and the first filter stage as the cleaning stage, successively.

The clean filter medium in the first filter stage accumulates particulate matter thereon and the particulate matter in the first filter stage forms a filter of enhanced filtration capacity in the second filter stage. After sufficient particulate matter in the first filter chamber has collected for efficient filtration, the fluid is diverted to bypass the second filtration chamber at which time the second filtration chamber is cleaned. By redefining each filtration chamber alternately as first and second filter stages, the filter can operate continuously after a filter layer is accumulated on the filter medium in the first and second filtration chambers.

In accordance with another embodiment of the invention, a housing having a fluid inlet and a fluid outlet is provided. First, second and third filtration chambers are positioned in the housing. Each of the filtration chambers has a filtration medium thereon from an upstream side to a downstream side thereof.

First conduit means are provided for selectably interconnecting any two chambers of the first, second and third filtration chambers in series for fluid flow from the downstream side of one of the two chambers defined as a first filter stage to the upstream side of the other of the two chambers defined as a second filter stage.

Second conduit means are provided for selectably interconnecting the fluid inlet in the housing with the upstream side of the filtration chamber defined as the first filter stage, the fluid outlet in the housing with the downstream side of the filtration chamber defined as the second filter stage and for interrupting fluid flow into and out of the third one of the first, second and third filtration chambers to define a cleaning stage.

Cleaning means are provided for cleaning particulate matter from the filter medium in the cleaning stage while fluid flow therewith is interrupted. Sequencing means are provided for selectably operating the first and second conduit means to redefine the cleaning stage as the first filter stage, the first filter stage as the second filter stage and the second filter stage as the cleaning stage, successively. The clean filter medium in the first filter stage accumulates particulate matter thereon. The particulate matter in the first filter stage forms a filter of enhanced filtration capacity in the second filter stage. By redefining each filter chamber as first and second filter stages and a cleaning stage, successively, the filter can operate continuously after a filter layer is accumulated on the filter medium in any one of the first, second or third filtration chambers.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIGS. 12-15 illustrate another embodiment of the filter in sequential stages of operation.

DESCRIPTION OF THE PREFERRED EMBODIMENT

Figure 1:
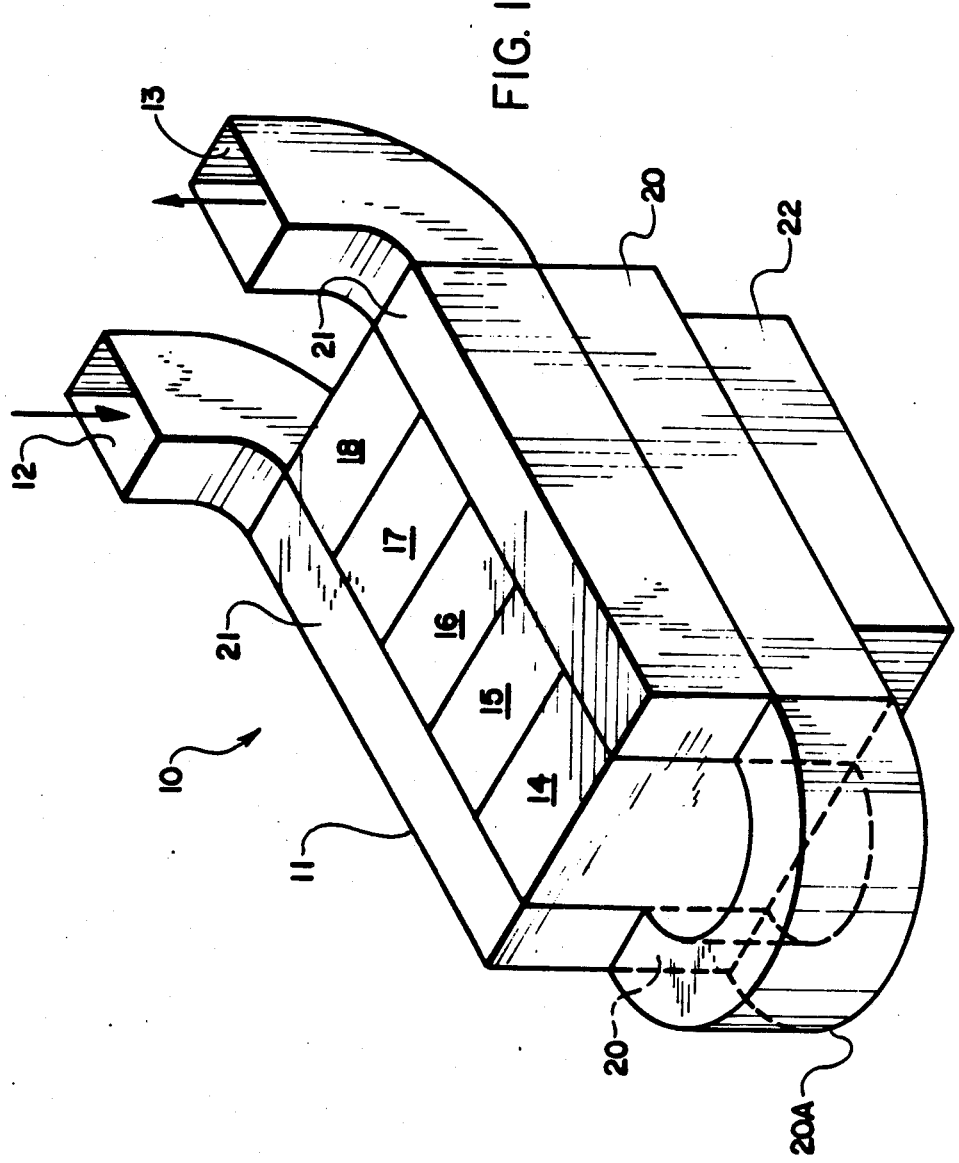
FIG. 1 is a perspective view of a filter according to the present invention.

Referring now specifically to the drawings, a multistage fluid filter according to the present invention is illustrated in FIG. 1 and broadly indicated at reference numeral 10. The fluid filter 10 is contained within a sheet metal housing 11 which is provided with a fluid inlet 12 and a fluid outlet 13. Five separate filtration chambers 14-18, inclusive, are positioned within housing 11. Conduits 20 and 21 are positioned within housing 11 as are sequencing means, comprising the mechanical apparatus such as solonoids and related hardware for operating filter components, contained within a cabinet 22.

Conduit 20 extends along both sides of filter 10 and communicates one side with the other through an arcuate conduit segment 20A. Conduit 21 likewise is positioned on both sides of filter 10. As can be seen in FIG. 1, one side of the second conduit defines inlet 12 and the other side of conduit 21 defines outlet 13. Communication between the two sides of conduit 21 takes place through filter chambers 14-18 in the manner described below.

Figure 2:
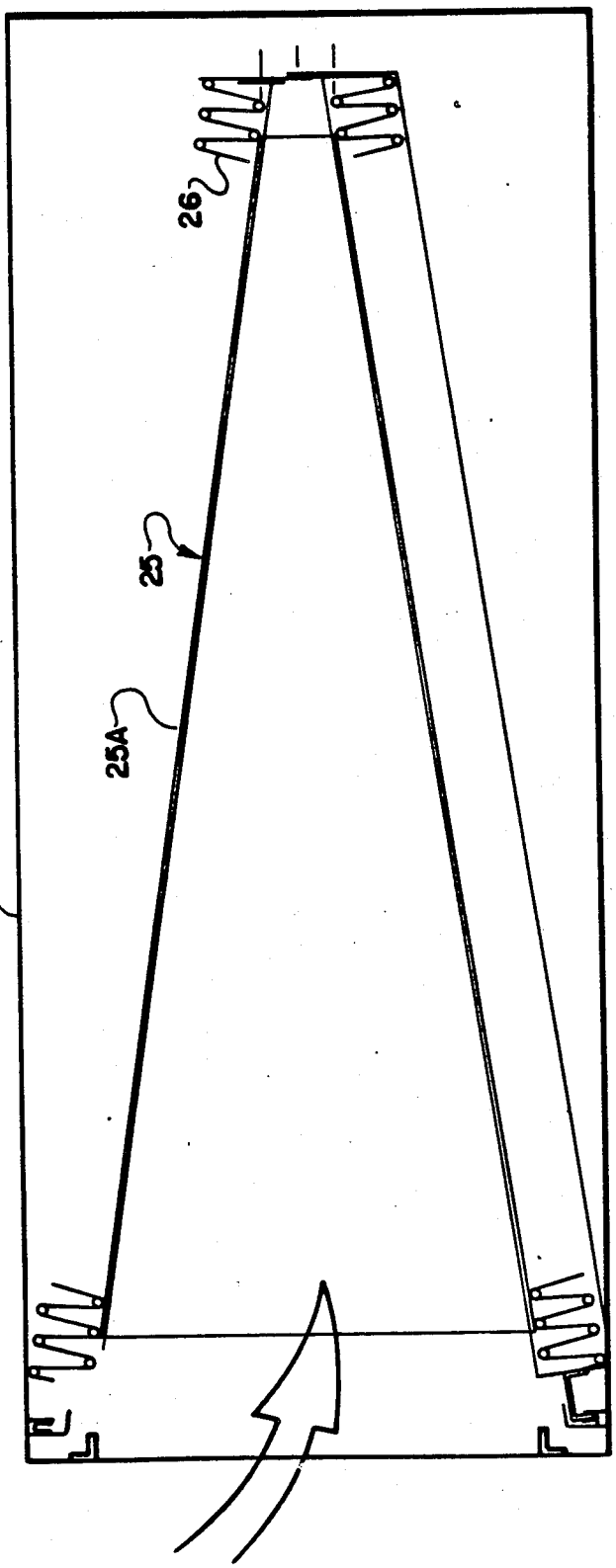
FIG. 2 is a top plan view, with parts broken away of a filtration chamber with the filtration medium positioned therein.

In FIG. 2, a filtration chamber is illustrated in a top plan view. Chambers 14-18 are identical in every respect, therefore, the detail in FIG. 2 relating to filtration chamber 14 suffices to illustrate the structure of all five chambers. As can be seen, filtration chamber 14 comprises a rectangular enclosed box within which is positioned a trapezoidily shaped filtration medium 25. Filtration medium 25 comprises a metal frame 25A on which is positioned, in accordion fashion, a wire screen 26 on which the filtered particulate matter accumulates. Wire frame 25 is sealed against the top and bottom of filtration chamber 14 so that fluid must pass through the wire screen 26.

In the embodiment shown in this application, the wire screen 26 is formed of a $60 \times 60$ warp/filling mesh but many other filter media, such as fabric, paper and plastic can be used depending upon the application. The interior of the filter medium 25 comprises the upstream side through which the particulate laden air enters, as is shown representationally by the arrow. The remainder of filtration chamber 14 outside of the filtration medium 25 comprises the downstream side of the filtration chamber. Therefore, as particulate-laden air passes through the filtration medium 25 from the upstream of the downstream side, particulate matter is accumulated on the inner surface of the wire mesh 26.

Figure 4:
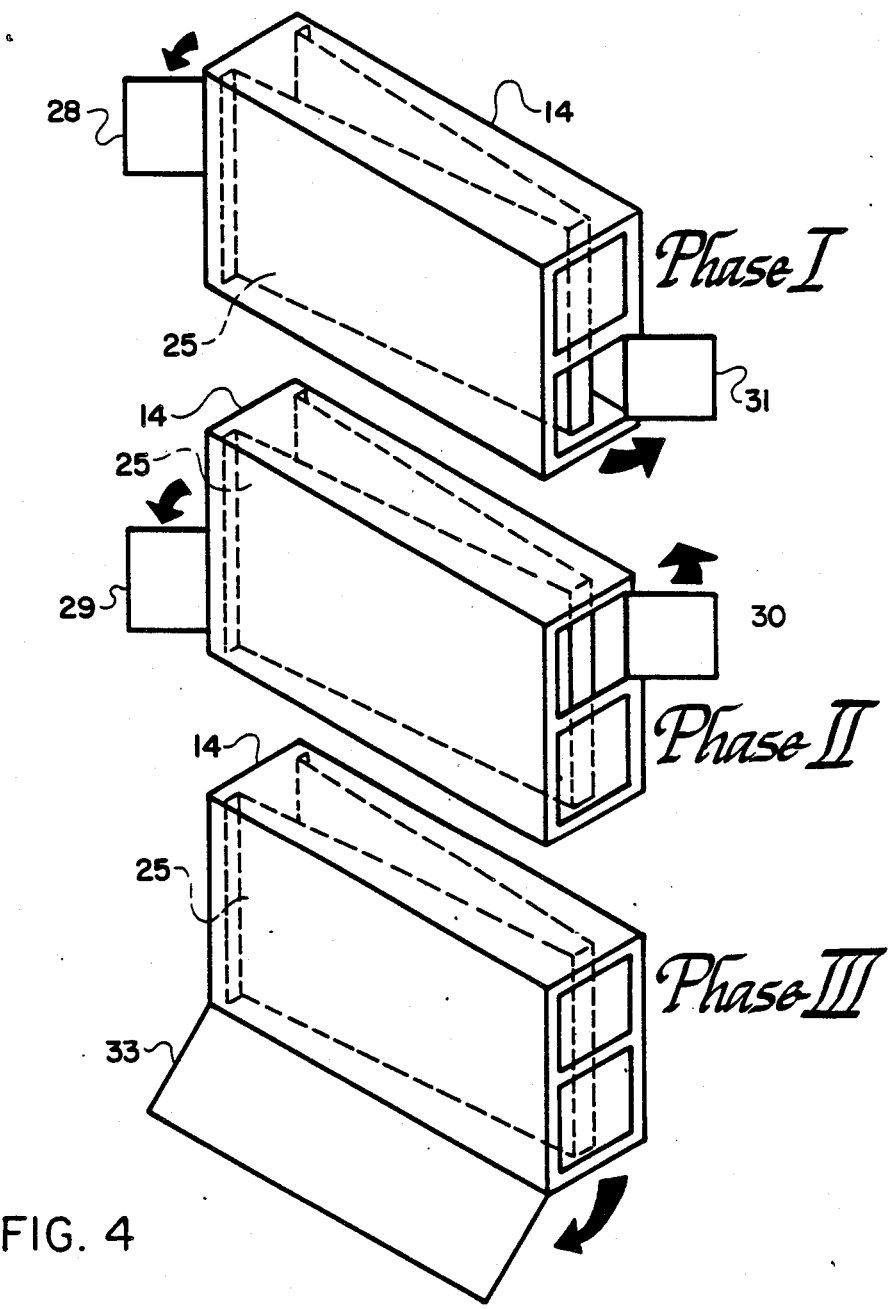
FIG. 4 is a simplified perspective view of a single filtration chamber in three sequential phases of operation.
Figure 5:
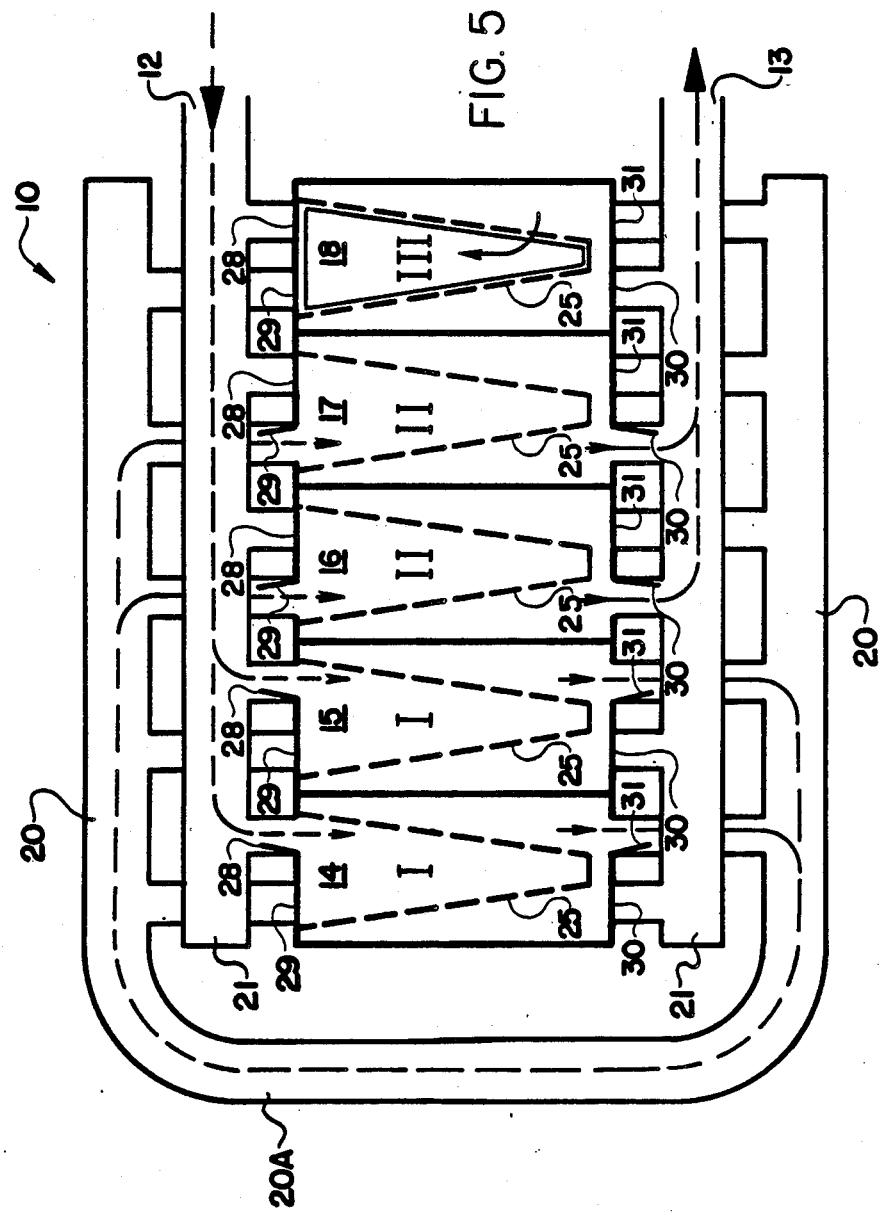
FIG. 5 is a schematic view with parts rearranged for clarity of the filter shown in FIG. 1 and showing the three stages during an initial phase of operation.

Referring now to FIG. 4, the construction of each of the filter chambers 14-18 is further illustrated. Again, since all of the filtration chambers 14-18 are identical, the operation will be described with reference to filtration chamber 14. As can be observed from FIG. 4, each filtration chamber passes through three successive phases. By refering simultaneously to the illustration of phases I and II, it will be noted that filtration chamber 14 has two vertically-spaced doors 28 and 29 on one end. On the other end of filtration chamber 14 are two similarly vertically-spaced doors 30 and 31. Note that doors 28 and 29 communicate with filtration chamber 14 through the upstream side and are therefore used to introduce particulate laden air into filtration chamber 14. Filtered air is discharged from filtration chamber 14 through doors 30 and 31.

Referring now to the phase III illustration in FIG. 4, filtration chamber 14 also includes a trap door 33 which encompasses substantially the entire bottom of the filtration chamber. This door is opened during the cleaning stage during which time the entire filtration medium 25 is shaken vigorously with a mechanical shaker or blown off with an air blast to dislodge the accumulated particulate matter on the inner surface of the wire screen 26.

Reference is now made to FIGS. 5-10. The filter 10 has been substantially rearranged in order to illustrate the sequence of operations. Basically, the doors 28, 29 and 30, 31 on each end of each of the filtration zones 14-18 are shown side-by-side rather than on top-to-bottom. In addition, the first and second conduits 20 and 21 have been rearranged so that the second conduit 21 is no longer positioned directly above the first conduit 20.

Air to be filtered enters the filter 10 through fluid inlet 12 and into conduit 21. Note, as in FIG. 1, that conduit 21 is in two segments with one segment on each side of the filtration chambers 14–18. Conduit 20 extends around filter 10 from one side to the other through a curved conduit segment 20A. Filtration chambers 14 and 15 have been identified with a Roman Numeral I corresponding to phase I in FIG. 4. Filtration chambers 16 and 17 have been identified with a Roman Numeral II corresponding with phase II in FIG. 4, and filtration chamber 18 has been identified with a Roman Numeral III corresponding with the phase III illustration in FIG. 4.

The purpose of the operation of the filter is to accumulate on the filtration medium 25 in chambers 14 and 15 a layer of particulate matter having an enhanced degree of filtration efficiency. Therefore, by continued reference to FIG. 5, air enters fluid inlet 12 and passes into conduit 21. Doors 28 in filtration chambers 14–18 communicate with conduit 21 immediately downstream of inlet 12. Doors 28 are closed in filtration chambers 16, 17 and 18. Therefore, all of the unfiltered air enters chambers 14 and 15 through open doors 28 and pass from the upstream to the downstream side of filtration medium 25. As the air passes through filtration medium 25, particulate matter is accumulated on its inner side. As the once filtered air passes through filtration medium 25, it enters the downstream side of filtration chambers 14 and 15 and exits through doors 31. Note that doors 31 communciate with conduit 20 and the air is directed through curved segment 20A back around to the upstream side of filtration chambers 14 and 15. Doors 29 which communicate with conduit 20 are closed in chambers 14, 15 and 18 and open in filtration chambers 16 and 17. Therefore, the air which has once been filtered in chambers 14 and 15 now enters the upstream side of chambers 16 and 17 and is filtered once again. In stage II, the filtration achieves a higher efficiency because particulate matter has already been allowed to accumulate to a predetermined thickness on the inner walls of filter medium 25, thereby defining a filter medium of enhanced filtration efficiency. Therefore, the stage II filtration chambers 16 and 17 perform an enhanced filtering operation on the air before it is discharged through open doors 30 into conduit 21 and out of filter 10 through fluid outlet 13. Filtration chamber 18 is defined as a cleaning stage (phase III). During the cleaning stage, all of the doors 28, 29, 30 and 31 in filtration chamber 18 are closed and door 33 (not shown in FIG. 5, but in FIG. 4) is opened and a mechanical shaker or an air blast (not shown) physically dislodges the layer of particulate matter contained on the inner surface of filter medium 25.

Figure 6:
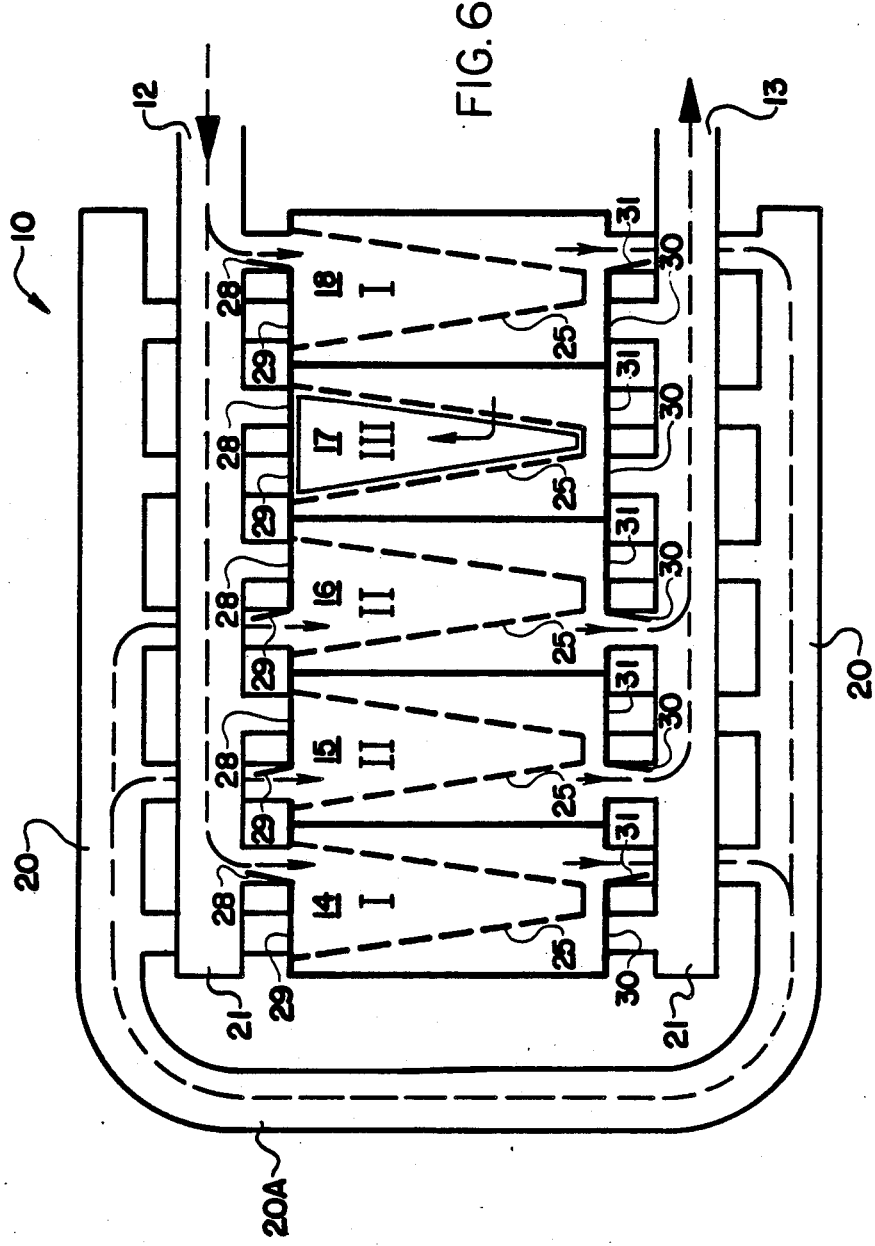
FIGS. 6-10 illustrate the filter shown in FIG. 5 in sequential stages of operation.

At a certain point, the thickness of the layer of particulate matter on the inner surface of filtration medium 25 in filtration chambers 16 and 17 (the phase II filtration step) becomes so great that resistance to the flow of air through the layer of particulate matter is unacceptably high. The layer of particulate matter on the inner surface of filtration medium 25 in the first stage filter chambers 14 and 15 gradually reaches its level of optimum filtering efficiency as the layer builds to its optimum thickness. At this point, an automatic pressure gauge (not shown) positioned between inlet 12 and outlet 13 contained in the sequencing means cabinet 22 open and close doors 28, 29, 30 and 31 so that the filtration stages are redefined as is shown in FIG. 6. Now, the first filtration stage comprises filtration chambers 14 and 18. This can be observed because doors 28 to these two chambers only are open. Therefore, unfiltered air from fluid inlet 12 into conduit 21 can only enter filtration chambers 14 and 18. Filter medium 25 in filtration chamber 18 is completely bare, having just been shaken and the particulate layer dislodged through door 33. A relatively thin layer of particulate matter is still accumulating on the inner surface of the filtration medium 25 in filtration chamber 14.

At the same time, the increasing thickness of the layer of particulate matter in filtration chamber 15 permits it to now serve as one of the filtration chambers in the second stage filtration step since the filtration efficiency of the layer of particulate matter is reaching its optimum. Note that doors 29 and 30 in filtration chambers 15 and 16 are open. Therefore, the air which enters filtration chambers 15 and 16 through doors 29 has just passed through filtration chambers 14 and 18 and has therefore been once filtered. Additional smaller particulate matter is removed in filtration chambers 15 and 16 whereupon the twice filtered fluid exits through open doors 30 into conduit 21 and through fluid outlet 13. Chamber 17 now has the greatest accumulation of particulate matter is now defined as the cleaning stage. Filter medium 25 is cleaned in the manner described above by opening door 33 and shaking the filter medium 25 to dislodge the layer of particulate matter.

Figure 7:
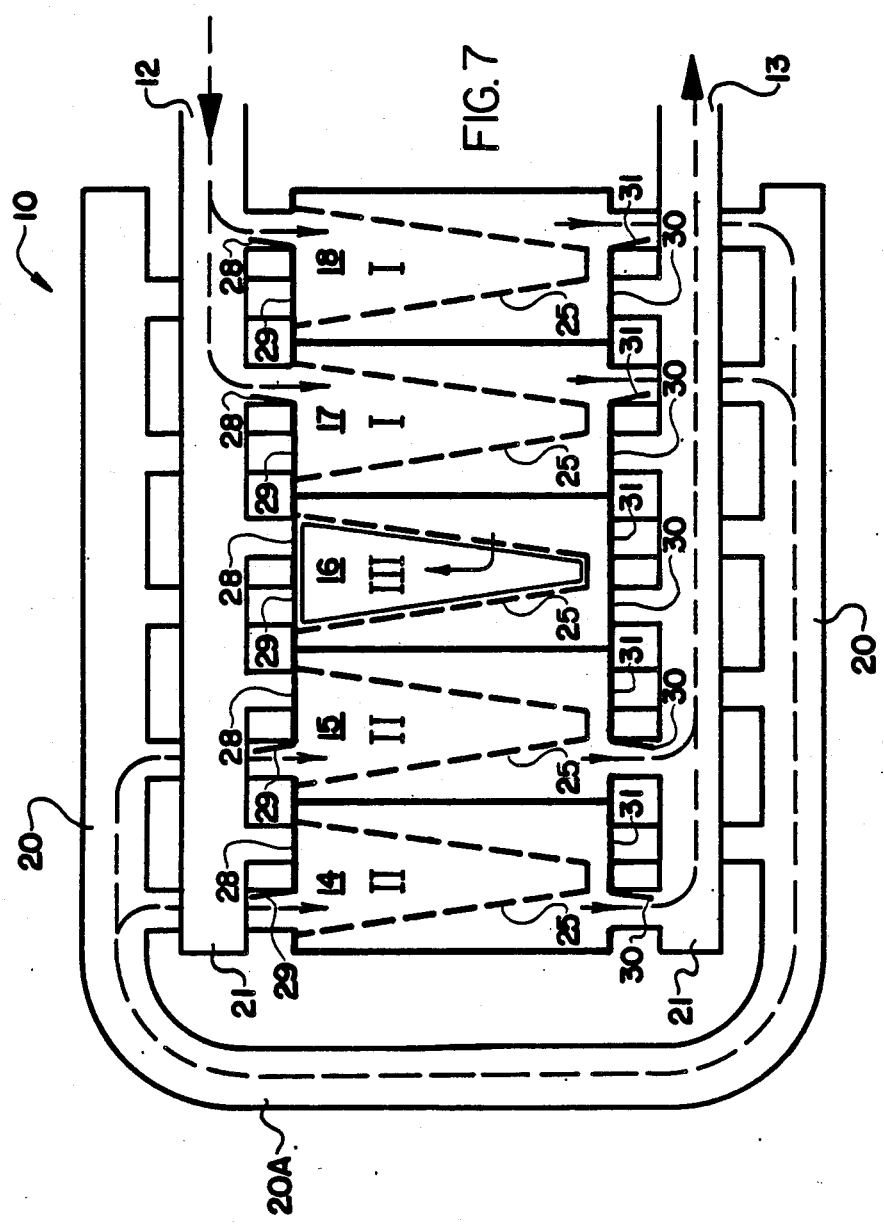

As can be seen in FIG. 7, the first filter stage now comprises filtration chambers 17 and 18. The filter medium in filtration chamber 17 is bare, having just been cleaned as illustrated in FIG. 6. The particulate layer in filtration chamber 18 is becoming thicker and is increasing in its filtration efficiency. Chambers 14 and 15 are now defined as the second filter stage, the layer of particulate matter therein having reached an optimum filtration efficiency. At the same time, the layer of particulate matter in filtration chamber 16 has become too thick to efficiently filter and allow the flow of air therethrough. Therefore, it is defined as the cleaning stage and it is cleaned in the manner described above.

Figure 8:
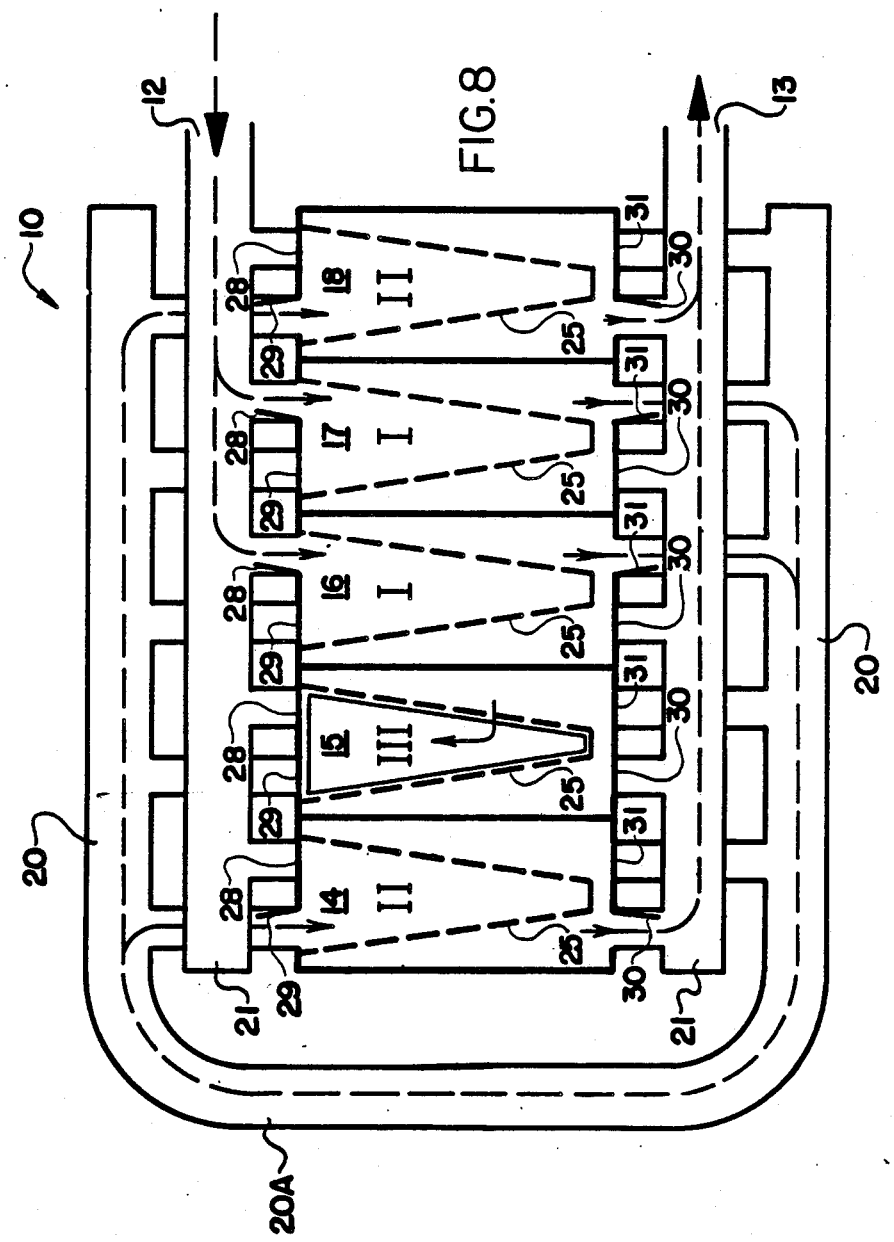

Referring now to FIG. 8, filtration chambers 14–18 have once again been redefined. Now, filtration chambers 16 and 17 comprise the first filter stage, the filter medium 25 in filtration chamber 16 being bare because of the cleaning stage just completed in FIG. 7. Chambers 14 and 18 comprise the second filter stage and filtration chamber 15 is defined as the cleaning stage. Note once again that the sequencing apparatus 22 has rearranged the pattern of opened and closed doors 28–31 so that the unfiltered air which enters conduit 21 through fluid inlet 12 first passes through filtration chambers 16 and 17 and then through filtration chambers 14 and 18 before exiting into conduit 20 and out through fluid outlet 13.

Figure 9:
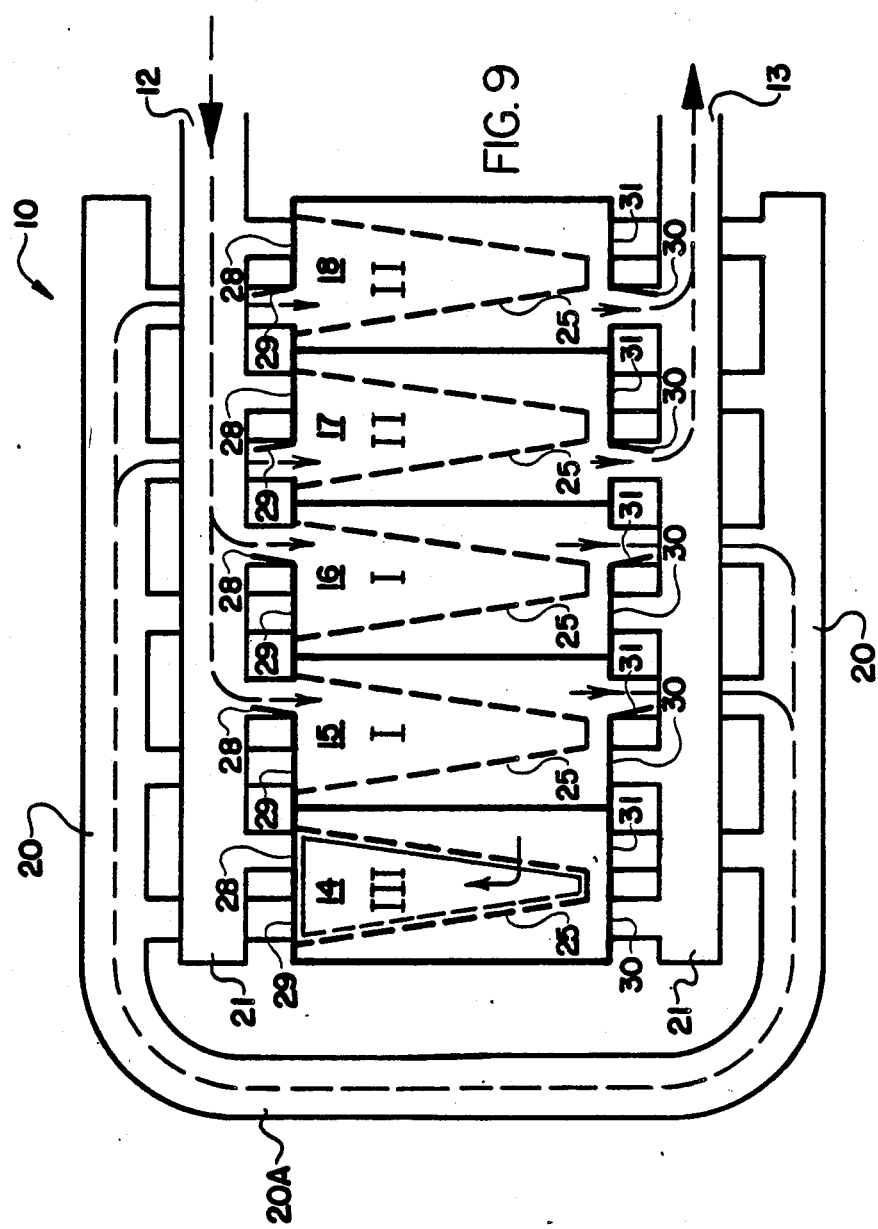

In FIG. 9, filtration chambers 15 and 16 comprise the first filter stage, filtration chambers 17 and 18 comprise the second filter stage and the filtration chamber 14 comprises the cleaning stage. Again, the doors are controlled in such a way as fluid enters first filtration chambers 15 and 16, then filtration chambers 17 and 18 before exiting through fluid outlet 13. During this time, the layer of particulate matter on the filter medium 25 in filter chamber 14 is being cleaned. When the layer of particulate matter increases beyond optimum thickness in filtration chamber 18, the first and second filtering stages and the cleaning stages are once again redefined, and the arrangement is back to where the operation began in FIG. 5.

Figure 10:
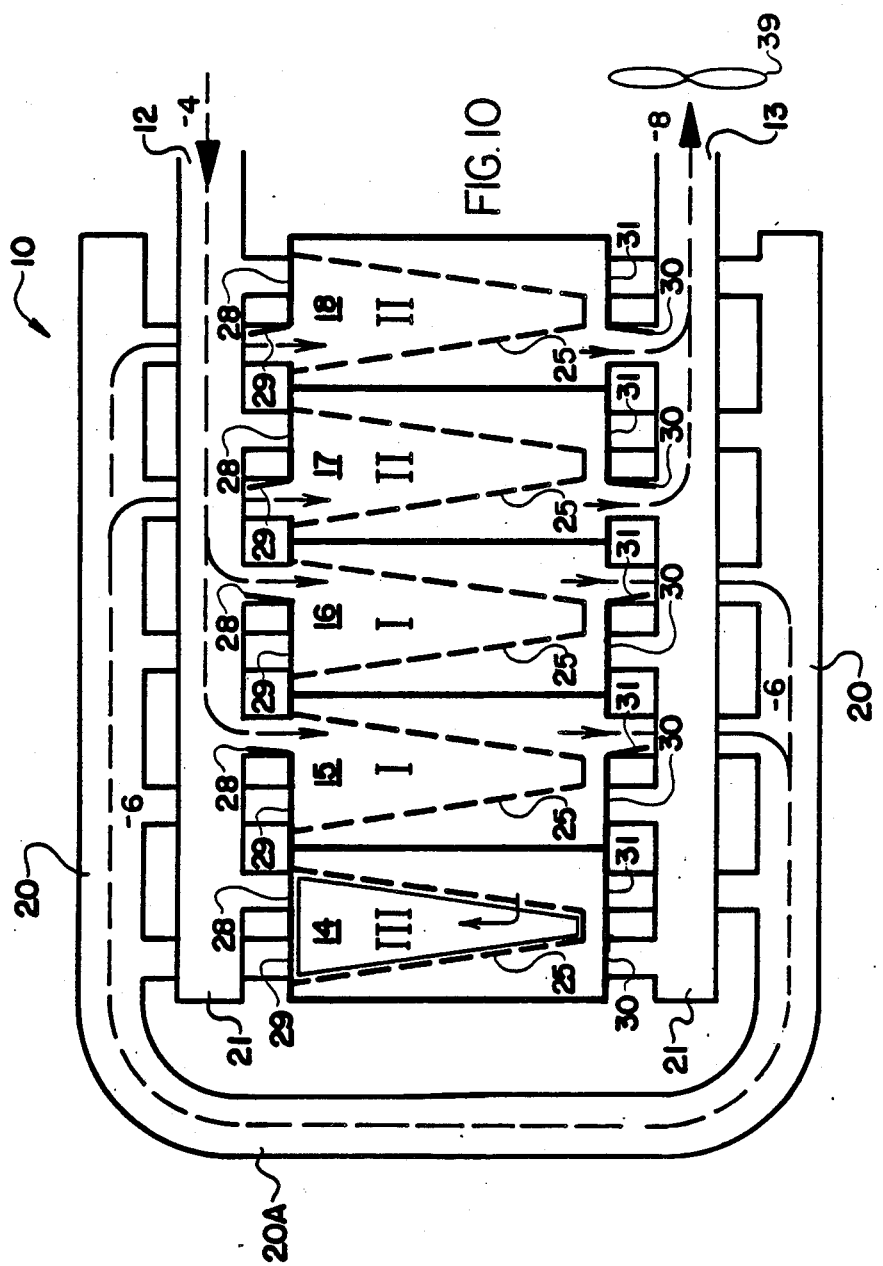

Referring now to FIG. 10, the same embodiment as illustrated in FIGS. 5-9 is shown. Air enters fluid inlet 12 at a pressure of minus 4 inches of water. A suction fan 39 for the filter 10 is positioned downstream of fluid outlet 13. Fan 39 exerts a pressure of minus 8 inches of water. Therefore, the pressure drop from the fluid inlet 12 to the fluid outlet 13 is four inches. The pressure of the air in conduit 20 is minus 6 inches of water. This reflects the fact that air in conduit 20 has been subject to one drag inducing pass through filter chambers 15 and 16, whereas the air upstream of filtration chambers 15 and 16 has been subject to none.

Figure 11:
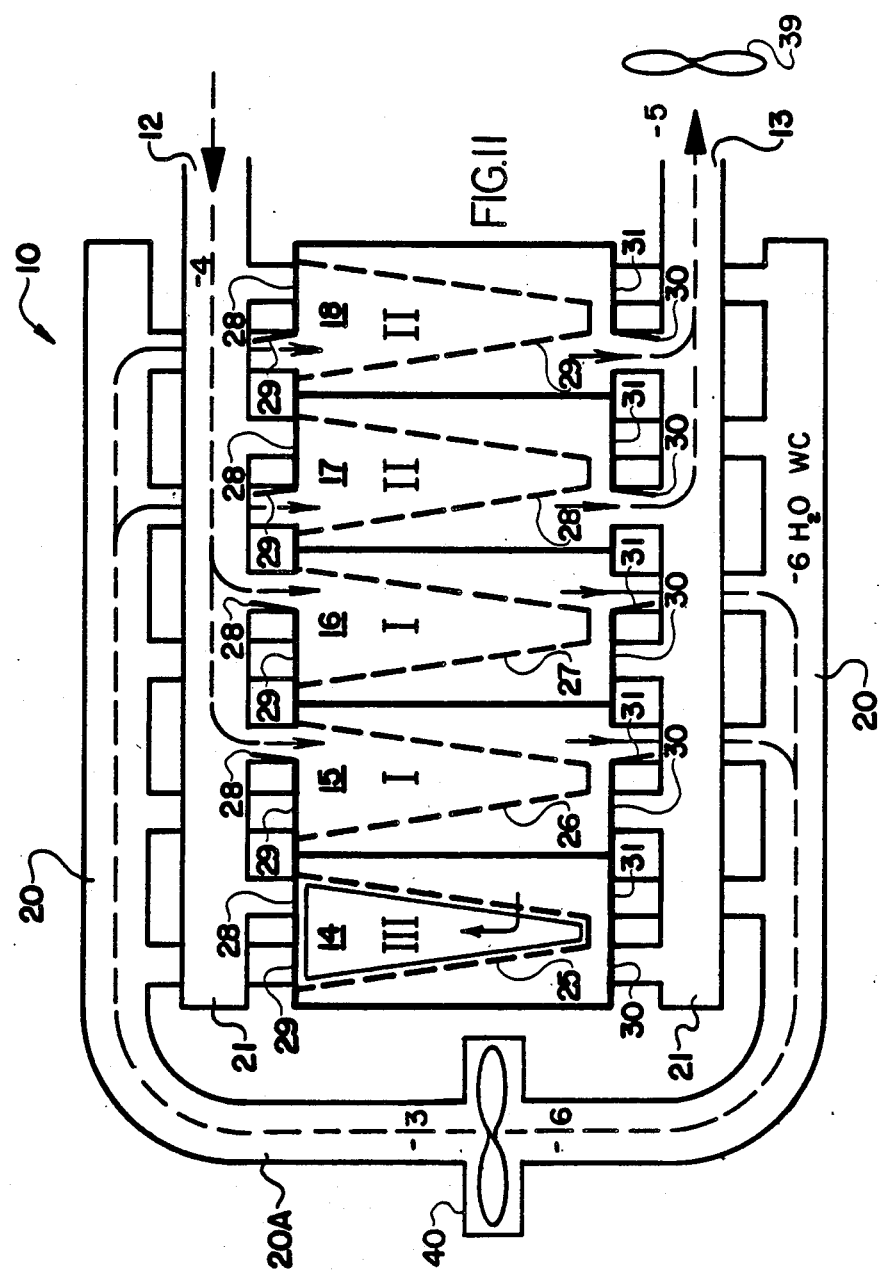
FIG. 11 illustrates a filter similar to that shown in FIG. 5 but with an auxiliary fan.

An alternate arrangement is shown in FIG. 11. Here, not only is there a fan 39 positioned downstream of fluid outlet 13 but also an auxiliary fan 40 positioned in the curved segment 20A of conduit 20. As in FIG. 10, air enters fluid inlet at a pressure of minus 4 inches. Auxiliary fan 40 increases this pressure to minus 6 inches of water on the downstream side of filtration chambers 15 and 16, and to minus 3 inches of water on the upstream side of filtration chambers 17 and 18. Filtered air exits through fluid outlet 13 at a pressure of minus 5 inches.

To summarize, the clean filter medium in the first filter stage, whichever filter chamber that might be, accumulates particulate matter thereon. The layer of particulate matter in the first filter stage forms a filter of enhanced filtration capacity when redefined as the second filter stage. By redefining each filtration chamber 14-18, successively, as first and second filter stages and a cleaning stage, the filter can operate continuously after a filter layer of optimum filtration efficiency has accumulated on the filter medium 25 in any of the filtration chambers.

Figure 3:
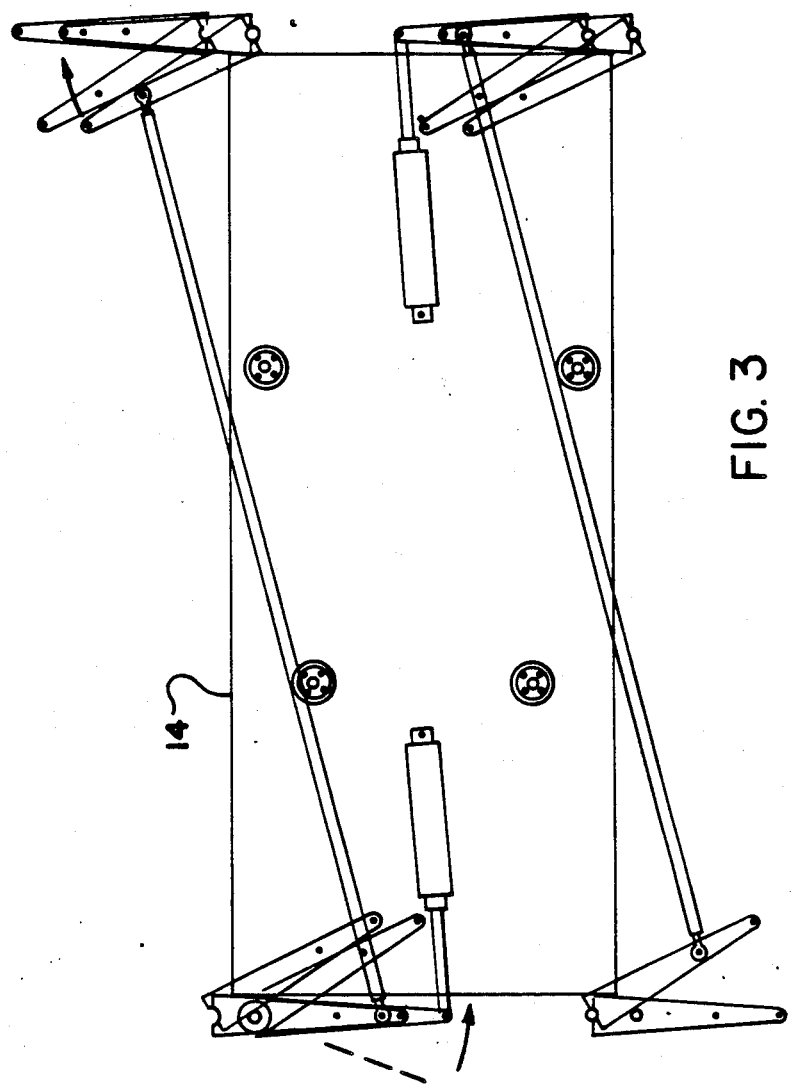
FIG. 3 is a top plan view of a filtration chamber showing the operation of the doors.

In the embodiment described above, a minimum of three filter chambers is required. However, there is no theoretical maximum number of filtration chambers which can be used. The chambers can be ganged together in any suitable arrangement an can be sequenced so that many more than only two filtration stages are defined. In the embodiment disclosed above, air velocity is nominally sixty feet per second. The doors are interconnected to open and close simultaneously by using interconnecting control rods as is shown in FIG. 3. The doors can be operated by conventional electric solonoids or pneumatic cylinders in a manner which is completely conventional per se and therefore requires no further discussion.

Another embodiment of the invention is illustrated in FIGS. 12-15. The construction of the filter 49 is in most respects identical to that described above. In the embodiment shown in FIGS. 12-15, only two filter chambers 50 and 51 are provided. However, as with the embodiment shown in FIGS. 5-11, any number of filter chambers can be used and ganged together as desired. Filtration chambers 50 and 51 are provided with a filter medium 52, in the form of a trapezoidal metal frame exactly as described earlier and illustrated in FIGS. 2 and 4. Air to be filtered enters a conduit 53 through fluid inlet 54. Air enters filtration chambers 50 and/or 51 through a door 55 in each. The air passes through the filtration medium 52 from the upstream to the downstream side thereof and exits through doors 57 on the downstream side of the filtration chambers 50 and 51. Doors 56 admit once filtered air from conduit 60 into filtration chambers 52 and discharge once filtered air into conduit 60 through doors 58 in the downstream side of filtration chambers 50 and 51. Air exits through conduit 53 on the downstream side of filtration chambers 50 and 52 through a fluid outlet 61.

Figure 12:
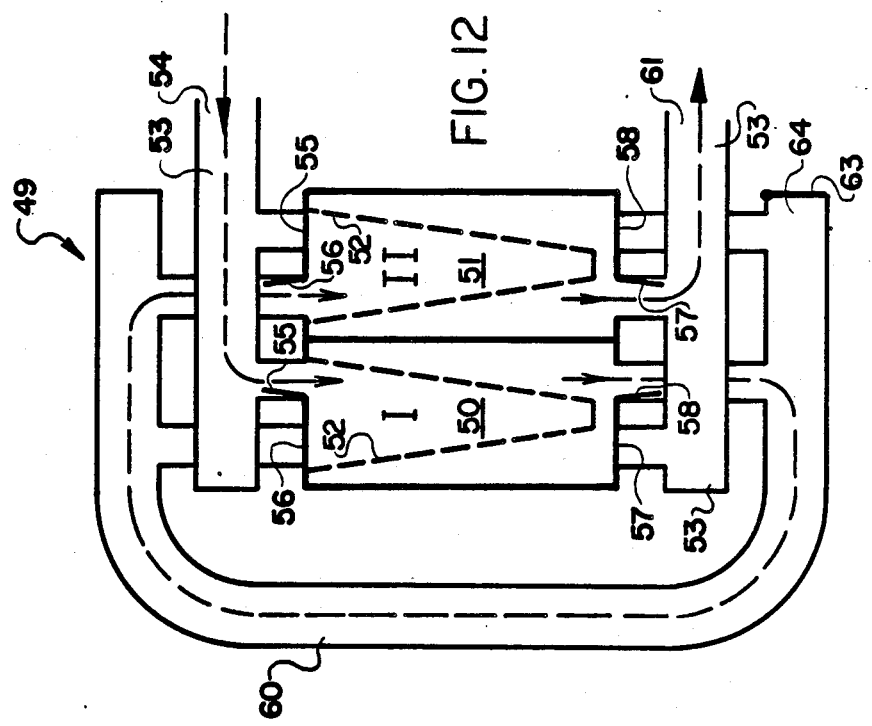

In the arrangement shown in FIG. 12, filtration chamber 50 is defined as a first filter stage and filtration chamber 51 is defined as a second filter stage. The stages, as previously, are represented by Roman Numerals I and II. Air enters conduit 53 through inlet 54. The air passes into filtration chamber 50 through open door 55 and passes through the filtration medium 52 to the downstream side of filtration chamber 50 and exits through open door 58. Note that no fluid enters directly into filtration chamber 51 from conduit 53.

The air which has once been filtered in filtration chamber 50 enters conduit 60 and is passed back around to the upstream side of filtration chamber 51 where it enters through open door 56. The air which has already been filtered once in filtration chamber 50 is filtered a second time in filtration chamber 51. The layer of particulate matter on the upstream side of filter medium 52 in filtration chamber 51 defines a filter medium of enhanced filtration capacity. Once the air has been filtered a second time, it exits the downstream side of filtration chamber 51 through open door 57 into conduit 53 and out fluid outlet 61.

Figure 13:
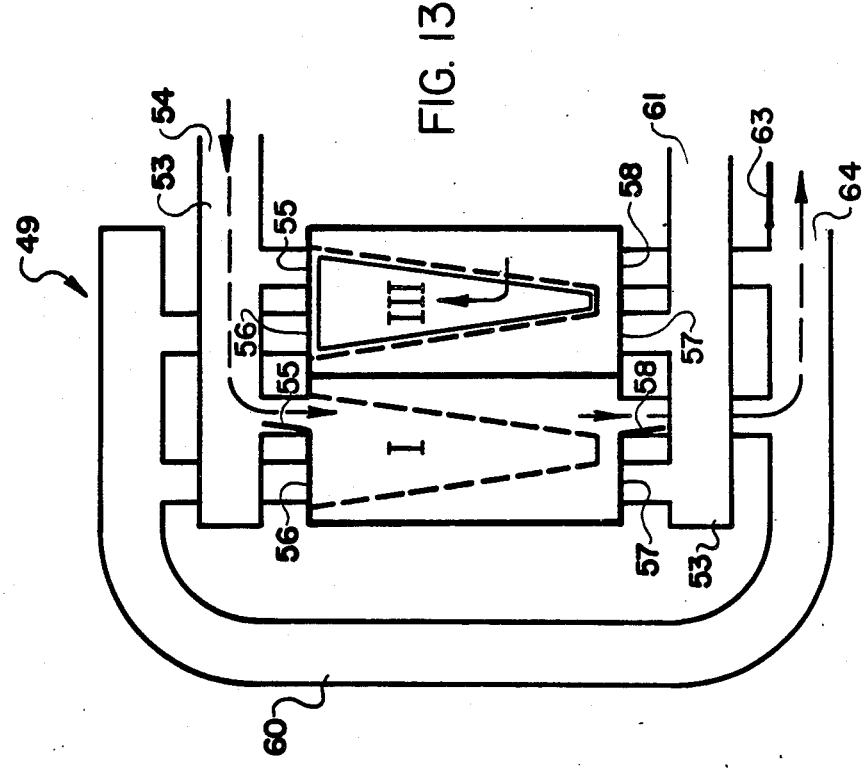
Figure 14:
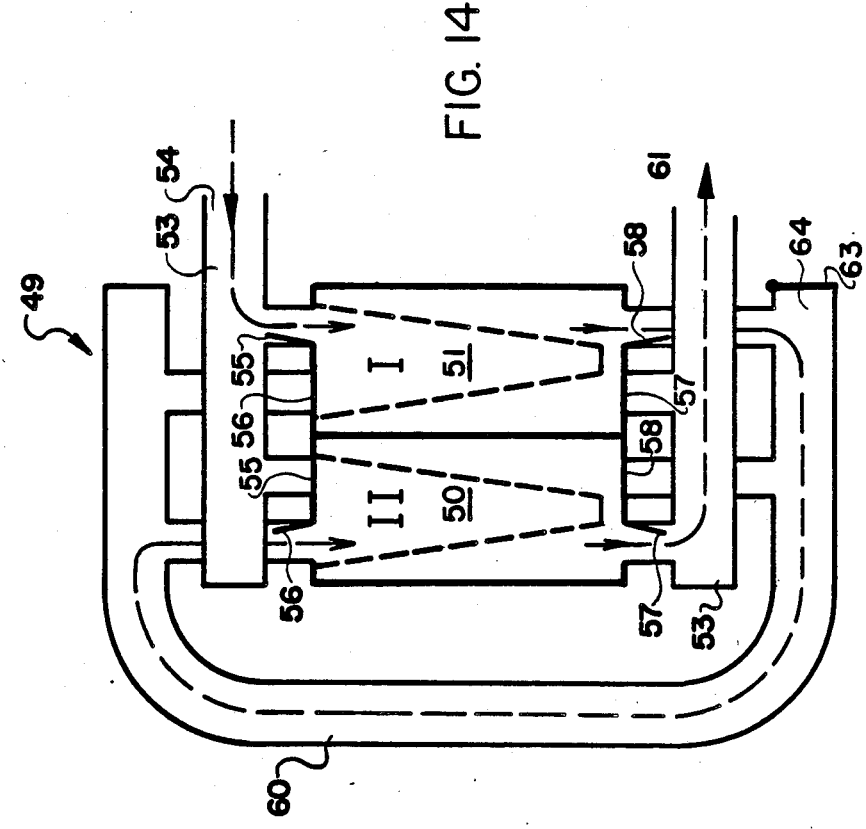

Referring now to FIG. 13, at the point during the filtration process when the layer of particulate matter on the filtration medium 52 in filtration chamber 51 (filter stage II) reaches a thickness and/or density where air passage is reduced below an acceptable level, filtration chamber 51 is redefined as a cleaning stage by closing all of the doors 55-58 therein and opening the lower cleaning door (not shown in FIG. 12, but see FIG. 4). A mechanical shaker physically removes the layer of particulate matter from the filtration medium 52, leaving a bare wire mesh filter surface. Note that filtration chamber 50 is still defined as the first filter stage as is indicted by open doors 55 and 58. However, since filtration chamber 51 is closed, air from filtration chamber 50 exits filter 10 through an auxilliary fluid outlet 64, normally closed by a door 63. (See FIG. 12).

After chamber 51 has been cleaned and when the layer of particulate matter in filtration chamber 50 reaches a suitable filtration efficiency level, doors 55 and 58 in filtration chamber 51 are opened, whereupon filtration chamber 51 begins to serve as a first stage filter. Simultaneously, doors 55 and 58 in filtration chamber 50 are closed and doors 56 and 57 are opened. Therefore, filtration chamber 50 begins operating as a second filter stage. In the configuration shown in FIG. 14, air enters through inlet 54 into conduit 53 and passes directly into filtration chamber 51 through open door 55. After leaving a deposit of particulate matter on the upstream side of filtration medium 52, the air exits the downstream end of filtration chamber 51 through open door 58 into conduit 60. Door 63 is now closed, so that the air is carried back around to the upstream side of filtration chamber 50 and enters filtration chamber 50 through open door 56. The twice filtered air exits through open door 57 into conduit 53 and out through fluid outlet 63.

In FIG. 15, the layer of particulate matter in filtration chamber 50 has accumulated to the point where it must be cleaned. Therefore, it is defined as a cleaning stage and is cleaned in the manner described above, while the layer of particulate matter in filtration chamber 51 continues to provide a filtration process to air entering through fluid inlet 54 and exiting through auxilliary fluid outlet 64. Note that in FIGS. 13 and 15 the air is subjected to only a single filtration process before exiting through auxilliary fluid outlet 64. Herein lies the primary distinction between filter 10 shown in FIGS. 5-11 and filter 49 shown in FIGS. 12-15. Filter 49 shown in FIGS. 12-15 is particularly suitable for situations where filtration standards are not as high but nevertheless where constant filtration at relatively high efficiency is desired.

A multi-stage fluid filter and method is described above. Various details of the invention may be changed without departing from its scope. Furthermore, the foregoing description of the preferred embodiments of a multi-stage fluid filter and method according to the present invention is provided for the purpose of illustration only and not for the purpose of limitation the invention being defined by the claims.

I claim:

1. A multistage fluid filter for filtering entrained particulate matter from a moving fluid stream at substantially constant fluid pressure and filtration efficiency during continuous on-line operation, said filter comprising:
   (a) a housing having a fluid inlet and a fluid outlet;
   (b) first, second and third stationary filtration chambers positioned in said housing, each having a filtration medium therein from an upstream side to a downstream side thereof;
   (c) first conduit means for selectably interconnecting any two chambers of said first, second and third filtration chambers in series for fluid flow from the downstream side of one of the two chambers defined as a first filter stage for accumulating particulate matter on the filtration medium thereof to the upstream side of the other of the two chambers defined as a second filter stage having a previously accumulated layer of particulate matter on the filtration medium thereof;
   (d) second conduit means for selectably interconnecting the fluid inlet in the housing with the upstream side of the filtration chamber defined as the first filter stage, the fluid outlet in the housing with the downstream side of the filtration chamber defined as the second filter stage and for interrupting fluid flow into and out of the third one of said first, second and third filtration chambers to define a cleaning stage therein;
   (e) cleaning means for cleaning particulate matter from the filter medium in the cleaning stage while fluid flow therewith is interrupted; and
   (f) sequencing means for selectably operating said first and second conduit means to, after cleaning particulate matter from the filter medium in the cleaning stage and, upon an increase in resistance to fluid flow through said second filter stage caused by an increase in thickness and/or density in the layer of particulate matter, redefine the cleaning stage as the first filter stage, said first filter stage as said second filter stage and said second filter stage as said cleaning stage, successively to permit the filter to operate continuously after a filter layer is accumulated on the filter medium in any of the first, second or third filtration chambers.

2. A multistage fluid filter according to claim 1, wherein said first conduit means includes a first door on the upstream side of each of said first, second and third filtration chambers and a second door on the downstream side of said first, second and third filtration chambers, and wherein said conduit means includes a first door on the upstream side of each of said first, second and third filtration chambers and a second door on the downstream side of said first, second and third filtration chambers, and wherein said sequencing means comprises means for simultaneously opening and closing certain predetermined of said doors to direct fluid flow in a predetermined manner through said housing from the fluid inlet to the fluid outlet.

3. A multistage fluid filter according to claim 2, wherein said cleaning means comprises a trap door positioned in gravity feed relation to the filtration medium, and means for removing the particulate matter from the filtration medium for gravity flow through said door.

4. A multistage fluid filter according to claim 3, whreein said cleaning means includes a shaker for shaking the frame of the filter medium in the filtration chamber defined as the cleaning stage to dislodge the filtered particulate matter thereon and permit it to drop by gravity feed through said trap door.

5. A multistage fluid filter according to claim 2, wherein said first, second and third filtration chambers comprise identical elongate rectangular metal enclosures, the first and second doors of said first conduit means being positioned on opposite ends of said metal enclosure and the first and second doors of said second conduit means being positioned adjacent the first and second doors of said first conduit means on opposite sides of said metal enclosure, and further wherein said trap door is positioned in the bottom of said rectangular metal enclosure.

6. A multistage fluid filter according to claim 5, wherein said filter medium comprises a trapezoid-shaped frame having filter fabric or a screen thereon and being positioned in said chamber intermediate the upstream and downstream sides thereof with said trapezoid-shaped frame sealingly engaging the walls of said metal enclosure intermediate the upstream and downstream sides thereof whereby fluid flow through said metal enclosure must be through said filter medium from the upstream to the downstream side thereof.

7. A multistage fluid filter according to claim 6, wherein said frame includes fan-folded sides carrying fan-folded filter medium thereon to increase the surface area through which the fluid can flow.

8. A multistage fluid filter for filtering entrained particulate matter from a moving fluid stream at substantially constant filtration efficiency during continuous on-line operation, said filter comprising:
   (a) first and second stationary filtration chambers, each having a filtration medium therein from an upstream side to a downstream side thereof;
   (b) conduit means for interconnecting said first and second filtration chambers in series for fluid flow from the downstream side of one of the two chambers defined as a first filter stage for accumulating particulate matter thereon to the upstream side of the other of the two chambers defined as a second filter stage having a previously accumulated layer of particulate matter on the filtration medium thereof for two stage filtration of the moving fluid and for diverting fluid flow downstream past one of said first of said second filtration chambers to define a cleaning stage within the filtration chamber past which fluid flow is diverted;

(c) cleaning means for cleaning particulate matter from the filter medium in the cleaning stage while fluid flow therethrough is diverted; and (d) sequencing means for selectably operating said diverting means to, after cleaning particulate matter from the filter medium in the cleaning stage and, upon an increase in resistance to fluid flow through said first filter stage caused by an increase in thickness and/or density in the layer of particulate matter, redefine the cleaning stage as the first filter stage and said first filter stage as said second filter stage successively to permit the filter to operate continuously after a filter layer is accumulated on the filter medium in the first and second filtration chambers.

9. A multistage fluid filter according to claim 8, wherein said first conduit means includes a first door on the upstream side of each of said first, second and third filtration chambers and a second door on the downstream side of said first, second and third filtration chambers, and wherein said conduit means includes a first door on the upstream side of each of said first, second and third filtration chambers and a second door on the downstream side of said first, second and third filtration chambers, and wherein said sequencing means comprises means for simulaneously opening and closing certain predetermined of said doors to direct fluid flow in a predetermined manner through said housing from the fluid inlet to the fluid outlet.

10. A multistage fluid filter according to claim 9, wherein said cleaning means comprises a trap door positioned in gravity feed relation to the filtration medium, and means for removing the particulate matter from the filtration medium for gravity flow through said door.

11. A multistage fluid filter according to claim 10, wherein said cleaning means includes a shaker for shaking the frame of the filter medium in the filtration chamber defined as the cleaning stage to dislodge the filtered particulate matter thereon and permit it to drop by gravity feed through said trap door.

12. A multistage fluid filter according to claim 9, wherein said first, second and third filtration chambers comprise identical elongate rectangular metal enclosures, the first and second doors of said first conduit means being positioned on opposite ends of said metal enclosure and the first and second doors of said second conduit means being positioned adjacent the first and second doors of said first conduit means on opposite sides of said metal enclosure, and further wherein said trap door is positioned in the bottom of said rectangular metal enclosure.

13. A multistage fluid filter according to claim 12, wherein said filter medium comprises trapezoid-shaped frame having filter fabric or a screen thereon and being positioned in said chamber intermediate the upstream and downstream sides thereof with said trapezoid-shaped frame sealingly engaging the walls of said metal enclosure intermediate the upstream and downstream sides thereof whereby fluid flow through said metal enclosure must be through said filter medium from the upstream to the downstream side thereof.

14. A multistage fluid filter according to claim 13, wherein said frame includes fan-folded sides carrying fan-folded filter medium thereon to increase the surface area through which the fluid can flow.

15. A method for filtering entrained particulate matter from a moving fluid stream at substantially constant fluid pressure and filtration efficiency during continuous on-line operation, said method comprising the steps of:

(a) providing a housing having a fluid inlet and a fluid outlet, first, second and third filtration chambers positioned in said housing, a filtration medium positioned in each filtration chamber from an upstream side to a downstream side thereof, first conduit means for selectably interconnecting any two chambers of the first, second and third filtration chambers in series for fluid flow from the downstream side of one of the two chambers defined as a first filter stage to the upstream side of the other of the two chambers defined as a second filter stage, second conduit means for selectably interconnecting the fluid inlet in the housing with the upstream side of the filtration chamber defined as the first filter stage, the fluid outlet of the housing with the downstream side of the filtration chamber defined as the second filter stage, and for interrupting fluid flow into and out of the third one of said first, second and third filtration chambers to define a second stage therein and cleaning means for cleaning particulate matter from the filter medium in the cleaning stage while fluid flow therewith is interrupted;

(b) accumulating particulate matter on the clean filter medium in the first filter stage;

(c) redefining the cleaning stage as the first filter stage, the first filter stage as the second stage and said second filter stage as said cleaning stage, successively, upon an increase in resistance to fluid flow through said second filter stage caused by an increase in thickness and/or density in the layer of the particulate matter;

(d) interrupting fluid flow to the cleaning stage; and (e) cleaning particulate matter from the filter medium in the cleaning stage while the fluid flow therewith is interrupted.

16. A method for filtering entrained particulate matter from a moving fluid stream at substantially constant filtration efficiency during continuous on-line operation, said method comprising the steps of:

(a) providing first and second filtration chambers each having a filtration medium therein from an upstream side to a downstream side thereof, conduit means for interconnecting the first and second filtration chambers in series for fluid flow from the downstream side of one of the two chambers defined as a first filter stage to the upstream side of the other of the two chambers defined as a second filter stage for two stage filtration of the moving fluid and for diverting fluid flow downstream past one of the first or second filtration chambers to define a cleaning stage within the filtration chamber past which fluid flow is diverting and cleaning means for cleaning particulate matter from the filter medium in the cleaning stage while fluid flow therethrough is diverted;

(b) directing particulate matter through the first filter stage to form a layer of particulate matter thereon;

(c) redefining the cleaning stage as the first filter stage and the first filter stage as the second filter stage, successively;

(d) upon the accumulation of sufficient particulate matter in the first filter chamber for efficient filtration, diverting the fluid past the second filtration chamber;

(e) cleaning the particulate matter from the filtration medium in the second filtration chamber; and (f) redefining each filtration chamber alterantely as first and second filter stages whereby the filter is permitted to operate continuously after a filter layer is accmulated on the filter medium in the first and second filtration chambers.

* * * * *